L. S. HUGHES.
APPARATUS FOR MANUFACTURING SUBLIMED WHITE LEAD.
APPLICATION FILED NOV. 19, 1909.
975,768.
Patented Nov. 15, 1910.
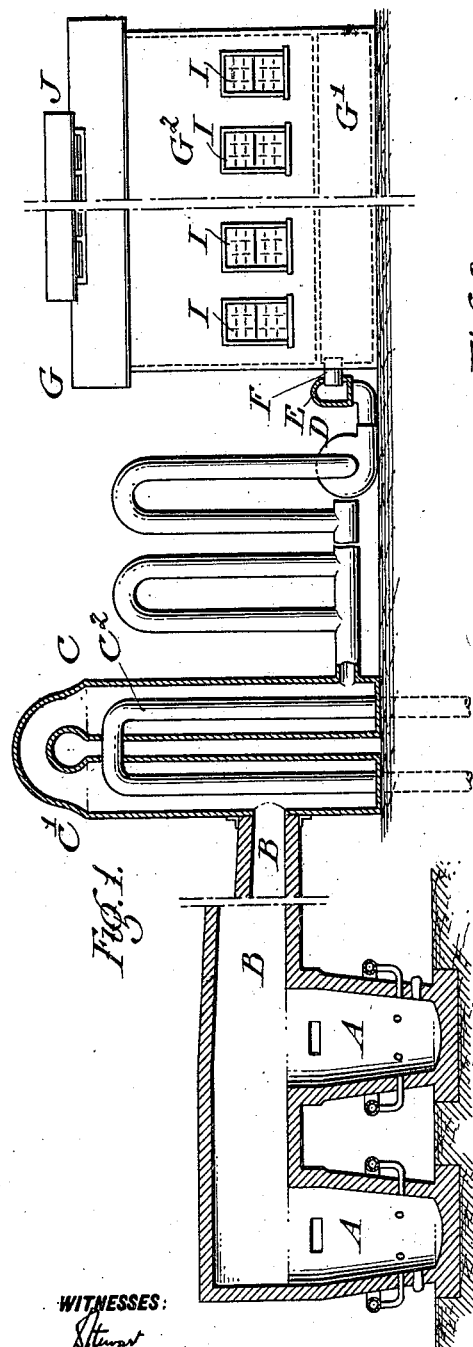
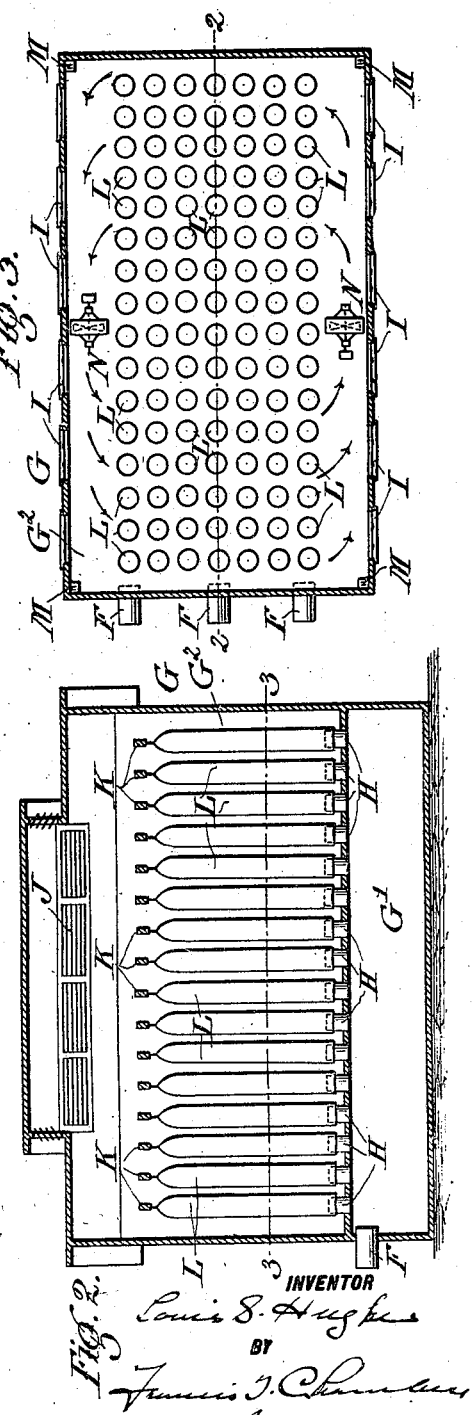

UNITED STATES PATENT OFFICE.

LOUIS S. HUGHES, OF JOPLIN, MISSOURI, ASSIGNOR TO PICHER LEAD COMPANY, OF JOPLIN, MISSOURI, A CORPORATION OF MISSOURI.

APPARATUS FOR MANUFACTURING SUBLIMED WHITE LEAD.

975,768.

Specification of Letters Patent. Patented Nov. 15, 1910.

Application filed November 19, 1909. Serial No. 528,853.

*To all whom it may concern:*

Be it known that I, LOUIS S. HUGHES, a citizen of the United States of America, residing in Joplin, in the county of Jasper, in the State of Missouri, have invented a certain new and useful Improvement in Apparatus for Manufacturing Sublimed White Lead, of which the following is a true and exact description, reference being had to the accompanying drawings, which form a part thereof.

My invention relates to apparatus for the manufacture of lead sulfate pigment and particularly to the construction of the screen or bag house used in separating the pigment from the gases from the furnaces wherein the sulfate is produced.

The lead sulfate pigment known in the market as " sublimed white lead " is made by treating lead bearing material in oxidizing furnaces adapted to convert the lead in large part into a finely divided "fume" of lead sulfate and the gases and fume issuing from the furnace after being subject to various treatments to eliminate heavy and discoloring impurities are passed through cooling flues to reduce their temperature and then carried to the bag house where the pigment is separated from the gases. The method and apparatus used are well described in the patent to Petraeus No. 492,832 of March 7, 1893, and the patents to Bartlett Nos. 515,039 and 515,040 of February 20, 1894, and another useful process and apparatus are described in my Patent No. 920,332 of May, 1909.

The lead sulfate pigment as heretofore made has been found liable to harm when mixed with oil and, after many tests and experiments it has been ascertained that this tendency is due to the occlusion in the pigment of acid compounds of sulfur either $SO_2$ or $H_2SO_3$. I have not been able to definitely determine which or whether both are not present owing to the fact that the percentage of acid is very small and some trace of moisture to be found in all samples.

I have discovered that the presence of the injurious acid in the pigment can be avoided by maintaining the gas and fume up to and during the screening operation at temperatures so high that the acid is maintained in dry vaporous form and thus prevented from becoming occluded in the pigment since it passes freely through the screen bags with the gases.

As heretofore constructed and used the screen chamber or bag house used in the separation of the furnace gases from the pigment has been quite freely ventilated it being considered and used as, in effect a part of the gas cooling system, and free ventilation being also desired to get rid of poisonous gases in the bag house, and thus make it possible for attendants to enter it.

My invention consists in using in connection with the producing furnaces and cooling flues a bag house constructed with closed walls and opening only at its top so that the bag house will constitute in effect a part of the flue system of the furnace in which the fabric bags are already surrounded and submerged by an atmosphere of furnace gas maintained at a constant and, as compared with former practice, a high temperature. The temperature must not exceed 350° F. in view of the danger of burning or charring the bags, and it must not be less than 250° F. to secure the elimination of the acid compounds of sulfur. A good working temperature I have found to be 300° F.

In view of the fact that the bag house in commercial use is a large chamber and climatic conditions are apt to exist which will tend to unduly cool the gas at one side or end of the building, I prefer to provide means for causing a horizontal circulation of the gases in the bag house and thus insure the maintenance of substantially uniform temperature in all parts of the chamber.

Of the drawings which illustrate my invention Figure 1 is a diagrammatic view of the plant as a whole. Fig. 2 a sectional elevation of the bag house on the line 2—2 of Fig. 3 and Fig. 3 a horizontal section on the line 3—3 of Fig. 2.

A, A, are the furnaces, B, the flue, C, the cooling flues including, as shown, the U shaped tower C', with inner cooling pipes $C^2$ through which air or water can be passed in varying volume to regulate the rate and extent of cooling.

D, is the suction fan, E, the pipe leading to the bag house through pipes F, F, etc.

G, is the bag house divided by a horizontal floor into chambers G' and $G^2$ connected by the bag nipples H, H, etc. The chamber $G^2$ instead of having open windows or ventilators in its walls as heretofore has its walls closed, glazed windows I, I, being provided for sighting purposes, the escape of gas being provided for by ventilators J at the top of the chamber. The chamber $G^2$ has bag supporting beams K, K, etc., at its top to which are secured the upper ends of the screen bags L, L, etc., the open lower ends of which are secured to the nipples H. At various distant points of the chamber $G^2$, as shown at the corners, I place temperature recording devices M, M, etc., observable from the outside, and by which the condition of the atmosphere surrounding the bags can be ascertained, and, to secure circulation and uniformity of temperature in the various parts of the chamber I provide circulating fans N, N.

In practice, the furnaces being in operation and fed with lead bearing material, the gases and metal fume are led through the flue B and cooling flues C and forced by fan D through pipes E and F into chamber G' whence the gases and fume pass through nipples H into the bags L, the gases passing through the bags and the screened out fume falling into and collecting in the chamber $G^2$.

The furnace combustion or the cooling flue energy or both are so regulated that the gases shall enter the bags as nearly as possible, at a temperature of 300° F. and the atmosphere of the chamber $G^2$ is also kept as nearly as possible at this temperatue so that the acid vapors will not tend to condense in the bags but will in dry vaporous form, pass with the gases from the ventilators J.

Having now described my invention, what I claim as new and desire to secure by Letters Patent is—

1. In combination with a furnace or furnaces for producing lead sulfate fume and a system of cooling flues to reduce the temperature of the furnace gases and fume, a screen system consisting of a bag house containing fabric bags into which the gases are led from the flues, said bag house having closed walls and gas exit openings only at its top above the tops of the bags.

2. In combination with a furnace or furnaces for producing lead sulfate fume and a system of cooling flues to reduce the temperature of the furnace gases and fume, a screen system consisting of a bag house containing fabric bags into which the gases are led from the flues, said bag house having closed walls and gas exit openings only at its top above the tops of the bags and means for causing the atmosphere of the bag house to circulate about in the bag house and maintain uniformity of temperature therein.

LOUIS S. HUGHES.

Witnesses:
 JERE. CHARLOW,
 RUBY SPARKS,